Figure 1:
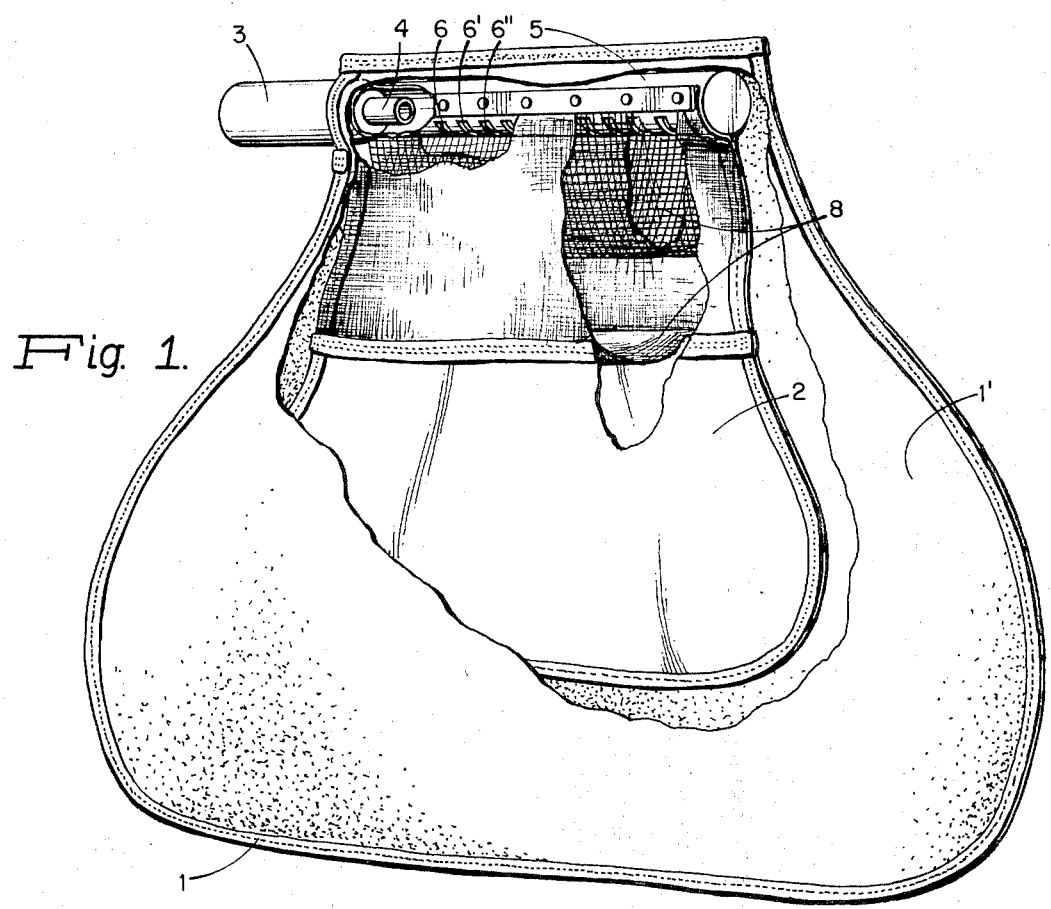

United States Patent [19]
Kurze et al.

[11] 3,799,575
[45] Mar. 26, 1974

[54] PROTECTIVE DEVICE FOR VEHICULAR PASSENGERS INCORPORATING SILENCING APPARATUS

[75] Inventors: Ulrich Kurze, West Roxbury; Hubert Arthur Wright, Jr., Lexington, both of Mass.

[73] Assignee: Allied Chemical Corporation, New York, N.Y.

[22] Filed: Feb. 29, 1972

[21] Appl. No.: 230,394

[52] U.S. Cl. .............. 280/150 AB, 181/35, 138/41
[51] Int. Cl. ............................................ B60r 21/08
[58] Field of Search ............... 280/150 AB; 181/35; 138/41, 42

[56] References Cited
UNITED STATES PATENTS

| | | | |
|---|---|---|---|
| 3,618,981 | 11/1971 | Leising | 280/150 AB |
| 3,666,289 | 5/1972 | Magyar | 280/150 AB |
| 2,850,291 | 9/1958 | Ziccardi | 280/150 AB |
| 3,552,770 | 1/1971 | Berryman | 280/150 AB |
| 3,527,472 | 1/1970 | Chute et al. | 280/150 AB |
| 3,618,976 | 11/1971 | Leising | 280/150 AB |
| 3,226,917 | 1/1966 | Donovan et al. | 181/35 R |

Primary Examiner—David Schonberg
Assistant Examiner—John P. Silverstrim
Attorney, Agent, or Firm—Jonathan Plaut; Ernest D. Buff

[57] ABSTRACT

This disclosure deals with improved pressurized fluid-expandable bag-like protective devices for vehicular passengers, incorporating novel critically positioned screen devices and the like for silencing the noise otherwise produced by the fluid expanding through manifold jet opening(s) within the bag, while restructuring the fluid flow so as to more uniformly inflate the bag and in some instances, simultaneously shielding the bag(s) from the heat generated during such expansion and catching particles carried in the fluid.

7 Claims, 3 Drawing Figures

PATENTED MAR 26 1974 3,799,575

PROTECTIVE DEVICE FOR VEHICULAR PASSENGERS INCORPORATING SILENCING APPARATUS

The present invention relates to pressurized gas or other fluid-expandable bag-like protective devices for vehicular passengers and the like, being more particularly directed to such devices incorporating silencing apparatus for limiting the relatively low-frequency sounds of the snap generated during the fluid-expanding or inflation of the bag from its collapsed inoperative state to its expanded operative impact-cushioning state; and the superimposed relatively high frequency noise produced as the fluid exits under pressure from manifold jet opening(s) within the bag.

Protective devices of this character are described, for example, in U.S. Letters Pat. Nos. 2,850,291; 3,425,712; and 3,450,414; but all such are subject, in varying degrees, to unpleasant, frightening and perhaps injurious noise, particularly high frequency noise, above say 300 Hertz. This high frequency noise is generated predominantly by two mechanisms; 1) jet and shock noise associated with the sudden transient burst of expanding gas, and 2) whipping and snapping of the bag material as it is rapidly inflated.

An object of the present invention, accordingly, is to provide a new and improved expandable protective device which serves to both decrease the jet and shock noise and also, by structuring the gas flow, to inflate the bag more uniformly, thereby decreasing the bag snapping and whipping.

A further object is to provide such a novel device in which the silencing apparatus may also serve simultaneously as a novel heat-shielding and solid particle capturing structure as well.

Other and further objects will be explained hereinafter and are more particularly delineated in the appended claims. In summary, however, from one of its broader aspects, the invention contemplates surrounding the manifold jet(s) provided within the bag device for enabling inflation by pressurized fluid streams exiting from the jet(s) in response to the release of the fluid, with a critically positioned and dimensioned screen or similar resistive-pore or apertured apparatus for preventing the violent mixing of the relatively high velocity exiting fluid stream with the zero or low velocity medium external to the jet manifold, but within the bag device, that otherwise would produce noise-generating vortex turbulence, and also to muffle the lower-frequency bag opening snap sounds, before discussed. Preferred details are hereinafter set forth.

Single or individual jet orifices have previously been muffled by vortex-inhibiting or splitting vane structures, as described, for example in Journal of Fluid Mechanics, Vol. 44, Part I, 1970, "Vortex Growth in Jets," Beavers et al., and in AIAA Paper No. 68–1023, October 1968, "Perspective of SST Aircraft Noise Problem," Schaierer et al.; and by perforated devices and screen baskets mounted from the periphery of the jet opening, as described, for example, by U. Ingard in "Attenuation and Regeneration of Sound in Ducts and Jet Diffusers," appearing commencing with page 1202 in the September 1959 issue of The Journal of the Acoustical Society of America. Such structures, however, are designed for steady flow and are not necessarily suited to effective noise suppression of transient events.

It has been discovered, for example, that, in many instances, a single screen is not optimally effective throughout a sudden, high velocity transient burst of gas, such as vehicle restraint systems employ, since some screens are effective during early nascent stages, whereas other or additional screens are effective during later stages. Moreover, previous screens and perforated devices are not of themselves adapted for direct use in confined areas and the like such as within protective bag devices; nor do their prior uses, above mentioned, deal with the problem of muffling a plurality of adjacent jet ports or openings successively disposed along a manifold conduit receiving a highly pressurized fluid stream burst, such that a plurality of adjacent fluid streams of successively different high velocities and pressures substantially simultaneously exit from the array of manifold jets. Such prior structures also do not treat with muffling a jet orifice or plurality of orifices which are very distended, being say 10 to 100 times longer than their width; nor are such devices concerned simultaneously with expanding-bag snap noises and/or heat shielding, as well.

It is to the solution of the above-described relatively high-frequency noise silencing problem in fluid-expandable protective bag devices, therefore, with the aid of such common screen and similar structures, that the present invention is thus further directed.

An additional object is to provide a novel fluid-expandable protective device of more general applicability, as well.

Still a further object is to provide such a device with novel silencing and/or heat shielding structures.

Figure 2:
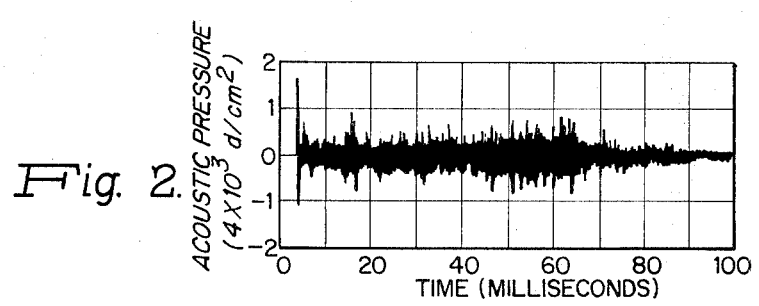
Figure 3:
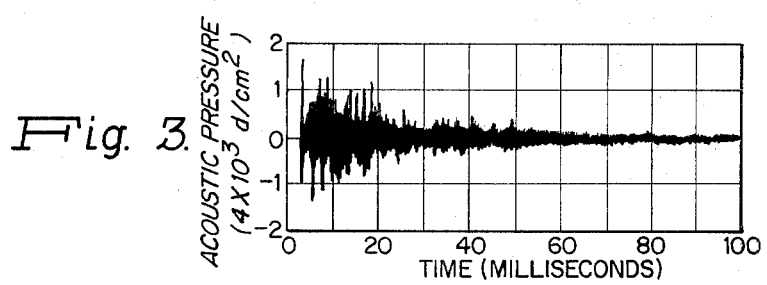

The invention will now be described with reference to the accompanying drawing, FIG. 1 of which is a longitudinal section of a preferred embodiment, illustrated in the inflated or partially expanded operative-state position; and FIGS. 2 and 3 are reproductions of measured noise waveforms.

A resilient outer protective bag (or multiple bags) is shown at 1 having preferably at least a region 1' that is somewhat porous to enable release a short interval after inflation to the operative impact-cushioning state, such as about 1 second, more or less. A protective inner simultaneously inflatable bag 2 may be provided to protect the knees of the vehicle passenger from impact forces. These bags may, for example, be of the types described in said Letters Patent and may be inflated by the release or discharge of compressed noncombustible gas or other appropriate fluid from a storage chamber 3 through an explosion-releasing plug 4 or similar valving means into and along a manifold conduit 5 having jet port, opening, slot, hole of other ventilating means, shown as a longitudinally extending plurality of jet port openings 6, 6', 6'', etc., though single elongated slot means can in some cases be employed longitudinally along the conduit 5.

As before mentioned, the high-frequency noise above about 300 Hz emanates principally from the high velocity gas streams existing through the adjacent jets 6, 6', 6'', etc. and can be as much as 160 decibels (dB) with respect to 0.0002 dynes/cm$^2$ at even three feet from the manifold conduit 5. When the ratio of the pressure inside the manifold 5 to that external to the jets within the bag 1 is greater than about 2 or 2.5, then the escaping gas stream is of sonic velocity. In accordance with the present invention, an appropriately porous or apertured screen surface 8 (or surfaces) is disposed near the jet ports 6, 6', 6'', etc., extending parallelly along and enveloping all the jets in the region where such mixing would normally substantially commence and generate noise, and affecting the gas flow so that it becomes predominantly radial, while substantially reducing turbulent mixing.

In the present invention, the screen(s) 8 must present sufficient impedance to gas flow as to be effective in restructuring flow from the manifold jet ports; yet it must not present so great an impedance to flow that pressure within the screen builds to the point of either physical rupture of the screen or generation of pressures within the screen which approach or significantly exceed about one-half the pressure within the manifold, since the result would be a decrease in gaseous mass flow through the manifold ports and an undesirable increase in bag inflation time. The area of the screen 8, should be large so that gas velocities through the screen are low (preferably subsonic); however an increase in surface area of an approximately cylindrical or spherical screen implies an increase in distance between the manifold ports and the screen, so that the effect of the screen upon gas flow takes longer to establish itself. The result is that relatively large screens (more remote from the manifold ports) are particularly effective at later times, while small screens (closer to the manifold ports) are most effective at early times. Since one of the purposes of the invention is noise reduction of the entire transient event, the optimal technique may involve the use of more than one screen or flow-impeding, restructuring means. It has been determined, moreover, that the effective area of the screen 8 must be greater (say at least 50–100 times, more or less) than the effective area of the manifold ports, so as to achieve the desired sub-sonic flow in the screen.

The above principles are substantiated, for example, by the experimental data presented in FIGS. 2 and 3. FIG. 2 is an oscillographic record of shock- and jet-noise in the high frequency band 0.3–20 kiloHertz observed 3.3 feet from a manifold to which there was affixed an approximately cylindrical screen of 10 inch effective circumference and twenty inch length (ends stitched closed). The inflatable bag was removed in this test. The average acoustic pressure was approximately $4 \times 10^3$ dynes/cm$^2$ peak-to-peak, being somewhat less initially and somewhat more after 30–40 milliseconds. FIG. 3 is a similar record obtained under nominally identical circumstances, except that a screen of 20 inch effective circumference (vs. 10 inch) was used. In FIG. 3, the average peak-to-peak levels are initially large ($10^4$ dynes/cm$^2$) but decrease rapidly as flow inside this larger screen is gradually effected, so that after about 20 milliseconds, the average pressure (noise) using this larger screen is significantly less intense than that observed using the smaller 10-inch screen.

In the above described and other actual test operations of inflatable restraint devices, cloth screens 8, such as Hesse-Goldsmith EM 1526 and other similar porous cloth have resulted in a high frequency (say above 300 Hz) noise reduction of 15 dB, more or less, using the manifold-jet muffling construction as in FIG. 1, and with no observable increase in inflation time of the bag 1. The screen was positioned a distance of the order of 4 inches from the manifold ports, while retaining an effective area approximately 60 times the effective total jet port area.

While screening type devices, as described in said Letters Patent have been proposed for preventing particles from exploding against the passengers and for more uniform flow, these have nothing to do with silencing or muffling sound and, indeed, are so dimensioned and positioned that they cannot achieve that function even inadvertently for the reasons above explained.

An auxiliary benefit of the invention has been found to reside, moreover, in the heat shielding effected by the screen(s) 8 so critically dimensioned and positioned as the hot gas expands. Additionally, of course, the release of the pressure plug and other respirable and larger solid particles are screened, and more uniform bag inflation results.

Further modifications will also occur to those skilled in this art and all such are considered to fall within the spirit and scope of the invention as defined in the appended claims.

What is claimed is:

1. A protective apparatus for a vehicular passenger and the like having, in combination, expandable bag means having a collapsed inoperative state and an expanded operative state for receiving and cushioning the passenger against impact; pressurized fluid storage means; manifold conduit means provided with jet opening means having a plurality of jet openings and disposed and enclosed within said bag; means for releasing the fluid within the storage means and discharging the same along the manifold conduit means, thereupon successively to exit at high source velocities as jet streams at successive positions of the jet opening means; and fluid-resistive screen means of effective area greater than that of the jet openings and located sufficiently close to said jet openings to substantially prevent strong turbulent mixing of said jet streams with the medium within the bag means, said screen means being disposed to envelope said jet opening means in the region of said jet streams and having sufficient impedance to flow from the jet opening means as effectively to restructure the flow, but not so resistive to flow as to substantially increase the time of released-fluid controlled expansion of the bag means, and without itself introducing large scale mixing; said screen means serving simultaneously to lessen snap and whip noise of expansion of the bag means by more uniform and more radial flow.

2. A protective apparatus as claimed in claim 1 and in which the fluid resistive screen means is of effective area from substantially fifty to one hundred times the effective area of the jet opening means.

3. A protective apparatus as claimed in claim 1 and in which said jet openings comprise jet ports disposed longitudinally along said manifold conduit means.

4. A protective apparatus as claimed in claim 1 and in which said jet openings comprise elongated longitudinal slots.

5. A protective apparatus as claimed in claim 1 and in which the screen means comprises first and second screens respectively disposed closer and more remote from the jet opening means, with the first screen means enveloping the jet opening means and the second screen means enveloping the first screen means.

6. A protective apparatus as claimed in claim 1 and in which said screen means is adjusted to lower flow velocities exiting therefrom to subsonic so as to lessen screen-radiated noise.

7. A protective apparatus as claimed in claim 1 and in which said screen means further serves to catch respirable and larger solid particles within the fluid, as well as effecting heat-shielding.

* * * * *